(12) United States Patent
Kakizaki et al.

(10) Patent No.: US 7,215,695 B2
(45) Date of Patent: May 8, 2007

(54) DISCHARGE EXCITATION TYPE PULSE LASER APPARATUS

(75) Inventors: Kouji Kakizaki, Kanagawa (JP); Youichi Sasaki, Tochigi (JP); Naoki Kataoka, Osaka (JP)

(73) Assignee: Gigaphoton, Tokyo (JP)

( * ) Notice: Subject to any disclaimer, the term of this patent is extended or adjusted under 35 U.S.C. 154(b) by 215 days.

(21) Appl. No.: 10/963,694

(22) Filed: Oct. 13, 2004

(65) Prior Publication Data

US 2006/0078028 A1 Apr. 13, 2006

(51) Int. Cl.
*H01S 3/22* (2006.01)
(52) U.S. Cl. .......................................... 372/55; 372/61
(58) Field of Classification Search ................. 372/55, 372/61
See application file for complete search history.

(56) References Cited

U.S. PATENT DOCUMENTS

| 4,205,732 | A | 6/1980 | Auerbach et al. |
| 5,978,405 | A | 11/1999 | Juhasz et al. |
| 5,991,324 | A | 11/1999 | Knowles et al. |
| 6,212,211 | B1 | 4/2001 | Azzola et al. |
| 6,317,447 | B1 | 11/2001 | Partlo et al. |
| 2003/0031225 | A1* | 2/2003 | Mizoguchi et al. ........... 372/55 |
| 2004/0184503 | A1 | 9/2004 | Bor |

FOREIGN PATENT DOCUMENTS

| JP | 63-1364 | 1/1988 |
| JP | 64-47070 | 3/1989 |
| JP | 64-084677 | 3/1989 |
| JP | 03-088377 | 4/1991 |
| JP | 03-225980 | 4/1991 |
| JP | 03-129788 | 6/1991 |
| JP | 03-248583 | 11/1991 |
| JP | 03-278488 | 12/1991 |
| JP | 04-328889 | 11/1992 |
| JP | 04-343489 | 11/1992 |
| JP | 06-216436 | 8/1994 |
| JP | 08-167748 | 6/1996 |
| WO | WO 99/45613 | 9/1999 |
| WO | WO 01/56122 | 8/2001 |

* cited by examiner

*Primary Examiner*—Dung T. Nguyen
(74) *Attorney, Agent, or Firm*—Welsh & Katz, Ltd.

(57) ABSTRACT

For the purpose of providing a discharge excitation type pulse laser apparatus capable of reducing disturbance of the discharge space caused by shock waves, the discharge excitation type pulse laser apparatus according to the present invention is designed for generating a pulsed main discharge by applying a high voltage between main electrodes (14, 15) including a cathode (15) and an anode (14) arranged in opposition to each other, and thereby exciting a laser gas in a discharge space (37) defined between the main electrodes to oscillate laser light (21), and characterized in that no reflector larger than a prescribed size is provided on a surface within a prescribed surface distance (LC) from the discharge space (37), and an insulating cathode insulating member (54) that is inclined such that the cathode (15) side end is highest is arranged on at least one of the upstream and downstream sides of the cathode (15) in close contact with the cathode (15).

13 Claims, 15 Drawing Sheets

DISCHARGE EXCITATION TYPE PULSE LASER APPARATUS

BACKGROUND OF THE INVENTION

1. Field of the Invention

The present invention relates to a discharge excitation type pulse laser apparatus.

2. Description of the Related Art

In a discharge excitation type pulse gas laser apparatus such as an excimer laser apparatus, pulsed discharge occurs by applying a high voltage to discharge space defined between opposing main electrodes to excite laser gas and to oscillate laser light. It is conventionally known that shock waves or acoustic waves (hereafter, to be generally referred to as "shock waves") produced during this electric discharge cause fluctuation in the laser density in the discharge space and thus the beam profile (beam intensity distribution), beam divergence, spectral line width and so on of the laser light become instable. An example of technologies to avoid such problem is disclosed in JP H4-328889A publication. FIG. 16 is a detail drawing showing the vicinity of discharge electrodes of an excimer laser apparatus 11 disclosed in the publication. The excimer laser apparatus according to the conventional technology will now be described with reference to FIG. 16.

In FIG. 16, metallic discharge electrodes 14 and 15 are arranged in opposition to each other within a laser chamber 12 enclosing a laser gas. The upper cathode 15 is fixed to an insulating cathode base 36, and the cathode base 36 is fixed to the laser chamber 12. The lower anode 14 is mounted on an anode base 40 electrically connected to the laser chamber 12. The cathode 15 is electrically connected to the high voltage side HV of a high voltage power supply 23, while the anode 14 and laser chamber 12 are electrically connected to the ground side GND of the high voltage power supply 23. A high voltage is applied between the discharge electrodes 14 and 15 by the high voltage power supply 23 to create a pulsed main discharge in the discharge space 37, whereby pulsed laser light is generated.

During this operation, shock waves 41 are generated from the discharge space 37 by the main discharge. These shock waves 41 are reflected by components near the discharge electrodes 14 and 15, such as the anode base 40 and the cathode base 36, and return to the discharge space 37, whereby the laser gas density in the discharge space 37 is varied. As the result, the main discharge will become instable or the beam profile of laser light will be disturbed. For avoiding such problem, in the above-mentioned publication, porous ceramics 45 and 45 are fixed onto the cathode base 36 and the anode base 40, respectively. These porous ceramics 45 and 45 serve to absorb the shock waves 41 for preventing the shock waves 41 from returning to the discharge space 37.

However, the above-mentioned conventional technology has problems as mentioned below. Even if the porous ceramics 45 are disposed close to the discharge space 37, it is still difficult to absorb all the shock waves 41 generated from the discharge space 37. Thus, the shock waves 41 which have not been absorbed are propagated towards the upstream and downstream sides along the space between the porous ceramics 45 and 45. These shock waves 41 will be reflected by some sort of reflector 50 upon exiting from the space between the porous ceramics 45 and 45 and return to the discharge space 37, causing disturbance to the beam profile, the beam divergence, spectral line width and the like.

Further, in FIG. 16 for example, the shock waves 41 flying out of the discharge space 37 in a substantially horizontal direction will not be absorbed by the porous ceramics 45 and exit out from the space between the porous ceramics 45 and 45. These shock waves will also be reflected by some sort of reflector 50 and return to the discharge space 37, causing disturbance to the beam profile, the beam divergence, the spectral line width and the like.

In other words, the conventional technology has no means to prevent the shock waves 41 which have not been absorbed by the porous ceramics 45, 45 from returning to the discharge space 37 and hence poses a problem that the disturbance in the discharge space 37 cannot be prevented completely.

SUMMARY OF THE INVENTION

The present invention has been made to solve the above-mentioned problem, and has an object to provide a discharge excitation type pulse laser apparatus which is able to reduce the disturbance in a discharge space caused by shock waves.

For achieving the aforementioned object, the present invention provides a discharge excitation type pulse laser apparatus designed for generating a pulsed main discharge by applying a high voltage between main electrodes including a cathode and an anode arranged in opposition to each other, and thereby exciting a laser gas in a discharge space defined between the main electrodes to oscillate laser light, wherein no reflector reflecting shock waves produced by the main discharge towards the discharge space is provided within a prescribed distance from the discharge space. Accordingly, since the reflector is located sufficiently far, it takes time for shock waves to be reflected by the reflector and to return to the discharge space, and hence the influence on the following or second following main discharge, for example, becomes insignificant.

Also, according to the present invention, the prescribed distance is a distance which ensures that, when shock waves produced by a main discharge in the discharge space are reflected by a reflector, those shock waves will not return to the discharge space before the following main discharge occurs. Since the shock waves do not return to the discharge space before the following main discharge occurs, the influence exerted by the shock waves on the following main discharge occurs is very small, and the disturbance of the beam profile, beam divergence, spectral line width and the like can be reduced.

In a discharge excitation type pulse laser apparatus designed for generating a pulsed main discharge by applying a high voltage between main electrodes including a cathode and an anode arranged in opposition to each other, and thereby exciting a laser gas in a discharge space defined between the main electrodes to oscillate laser light, no reflector larger than a prescribed size is provided on a surface within a prescribed surface distance from the discharge space, and an insulating cathode insulating member that is inclined such that the end on the cathode side is highest is arranged on at least one of the upstream and downstream sides of the cathode in close contact with the cathode. According to such configuration, even if a reflector is present on a surface of the cathode insulating member, this reflector is sufficiently far from the discharge space, and hence it takes time for shock waves reflected by the reflector to return to the discharge space. Therefore, the influence exerted on the following or second following main discharge is reduced.

Also, according to the present invention, the prescribed surface distance is a distance which ensures that, when shock waves produced by a main discharge in the discharge space are reflected by the reflector, those shock waves will not return to the discharge space before the following main discharge occurs. According to such configuration, even if the reflector is present on a surface of the cathode insulating member, shock waves reflected by the reflector will not return to the discharge space before the following main discharge occurs. Therefore, the influence exerted by the shock waves on the following main discharge occurs is very small, and the disturbance of the beam profile, the beam divergence, the spectral line width and the like is also reduced.

Also, according to the present invention, the prescribed surface distance is determined based on an acoustic velocity in the laser gas and an oscillation frequency of the laser light. The speed of shock waves is determined according to the acoustic speed in the laser gas and the time interval of the main discharges is determined according to the oscillation frequency. Therefore, the influence exerted by the shock waves on subsequent main discharges can be reduced by determining these factors such that the time required for the shock waves to return does not match the time interval of the main discharges or an integral multiple thereof.

Further, according to the present invention, the prescribed surface distance is larger than $V/(2\tau)$ in terms of the relation between an acoustic velocity in the laser gas and an oscillation frequency of the laser light. According to such configuration, shock waves reflected by the reflector will not return to the discharge space before the following main discharge occurs, and hence the influence exerted by the shock waves on the following main discharge occurs is very small, and the disturbance of the beam profile, the beam divergence, the spectral line width and the like also can be reduced.

Further, according to the present invention, the prescribed surface distance is larger than the larger value between the value of $V/(2\tau)$ and the tripled value of the distance between the main electrodes. As the result, it is possible to prevent creeping discharge from occurring between the cathode and another metallic member and to generate a main discharge stably.

Further, according to the present invention, insulation ribs are provided in an area further than the prescribed surface distance from the cathode side end of the cathode insulating member. According to such configuration, shock waves reflected by the insulation ribs are less apt to disturb the discharge space, and the creeping discharge can be prevented more reliably by the insulation ribs.

Further, according to the present invention, the upper limit of the size of the reflector is 1 mm. If the reflector is not larger than 1 mm, the reflector will not reflect shock waves significantly, and the presence of the reflector will not constitute a factor for disturbing the beam profile, beam divergence, spectral line width or the like. If insulation ribs of this size are provided, the creeping discharge can be prevented reliably without disturbing the discharge space.

Further, according to the present invention, no reflector larger than a prescribed size is provided on a surface within a prescribed surface distance from the discharge space, and an anode insulating member that is inclined such that the anode side end is highest is arranged on at least one of the upstream and downstream sides of the anode in close contact with the anode. As the result, reflection of the shock waves propagated toward the anode side also can be prevented, and hence the disturbance of the discharge space can be reduced.

Further, according to the present invention, a preionization electrode having an internal electric conductor and a dielectric is embedded in an insulating member such that the surface of the dielectric is substantially flush with the surface of the insulating member. As the result, it becomes less likely that the shock waves are reflected by the preionization electrode and hence the disturbance of the discharge space can be reduced further.

Further according to the present invention, the dielectric of the preionization electrode has a prismatic shape. Therefore, it is easier to embed the preionization electrode in the insulating member with its surface substantially flush with the surface of the insulating member.

Further, according to the present invention, the dielectric of the preionization electrode has a cylindrical shape that is partially flattened by removing the part of the cylindrical dielectric. When fabricating the dielectric from alumina ceramics, the fabrication is made easier by this method, namely by forming the dielectric into a cylindrical shape and then removing a part of the cylindrical dielectric.

DESCRIPTION OF THE EMBODIMENTS

Embodiments of the present invention will now be described in detail with reference to the drawings. First, description will be made on attempts to inhibit shock waves generated by a main discharge from returning to the discharge space before the following main discharge occurs even if the shock waves are reflected by some sort of reflector.

Figure 1:
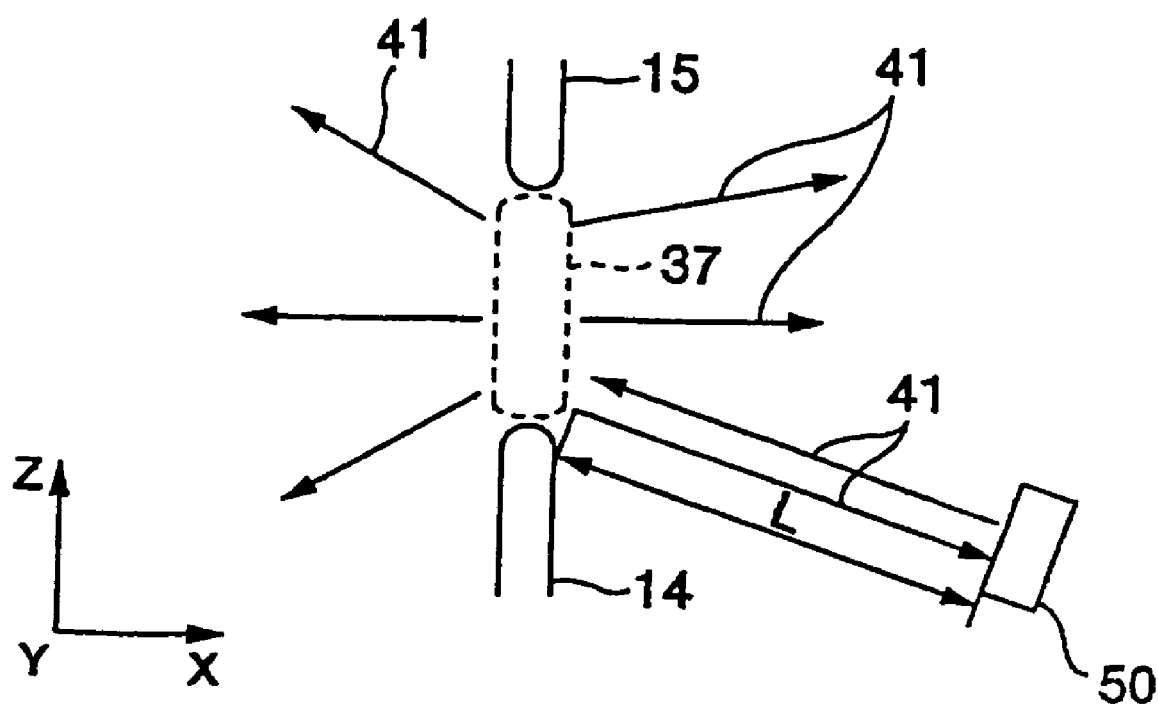
FIG. 1 is a schematic diagram showing shock waves in a discharge space according to the present invention.

FIG. 1 is a schematic diagram showing the vicinity of a discharge space 37. In FIG. 1, when a pulsed main discharge is generated between main electrodes 14 and 15 including a cathode 15 and an anode 14 arranged in opposition to each other in a laser gas atmosphere, at a predetermined oscillation frequency, shock waves 41 are produced from the discharge space 37 defined between the main electrodes 14 and 15. The shock waves 41 are propagated to every direction from the discharge space 37, and impinge against and are reflected by a reflector 50 which is located at a distance L from the discharge space 37, for example. The reflected shock waves are thus propagated for the to-and-fro distance (2L) and return to the discharge space 37. Note that, in FIG. 1, the same plane as the plane of paper (the plane X-Z in the drawing) is referred to as "the beam cross-sectional plane", and the direction perpendicular to the plane of paper (the Y direction in the drawing) is referred to as "the longitudinal direction of the main electrodes 14, 15, or simply as "the longitudinal direction". There also exist shock waves 41 which are reflected from the longitudinal direction, and such shock waves may constitute a factor to disturb the laser gas density in the discharge space 37. However, the influence exerted by such shock waves 41 on the beam profile, beam divergence, or spectral line width is small. This means that the beam profile, beam divergence, the spectral line width and the like of laser light 21 emitted from the laser chamber 12 can be obtained by integrating, along the longitudinal direction, the beam intensity distribution in the beam cross-sectional plane perpendicular to the optical axis. Accordingly, even if there occurs unevenness in the laser gas density distribution within the discharge space 37, the possibility is low that such unevenness occurs uniformly over the longitudinal direction, and uniformity is obtained by integrating various unevenness distributions. Therefore, the following description will be made only on the reflection in the beam cross-sectional plane.

Possible disturbance of the discharge space 37 by shock waves 41 will not have significant consequence on main discharges if the reflector 50 is arranged sufficiently far so that the following main discharge occurs is generated before shock waves 41 reflected by the reflector 50 return to the discharge space 37. Specifically, when it is assumed that shock waves 41 are propagated for a to-and-fro distance (2L), the time required for the shock waves 41 to be reflected and return to the discharge space 37 is represented by t, and the oscillation frequency of laser light 21 is represented by τ, the influence of the shock wave 41 can be reduced if t>(1/τ). Here, if the velocity of the shock waves 41 is represented by V, then t=2L/V, and hence the following expression 1 can be obtained.

$$2L/V > 1/\tau \quad (1)$$

Therefore, it is possible to reduce the adverse effects of the shock waves 41 on main discharges by setting the distance L to the reflector 50 so as to satisfy the following expression 2.

$$L > V/(2\tau) \quad (2)$$

Taking an ArF excimer laser apparatus for example, a major part of its laser gas is composed of neon. Since shock waves 41 are propagated at an acoustic velocity, the propagation velocity thereof within the laser gas is about 460 m/sec. If the oscillation frequency τ is 4 kHz, the time required from a main discharge to the following main discharge occurs (1/τ) is 250 Rsec and hence the distance L satisfying the expression 2 is larger than 60 mm. This means that, if the oscillation frequency is 4 kHz, the distance L from the discharge space 37 to the reflector 50 can be set to larger than 60 mm so that the shock waves 41 reflected by the reflector 50 and returning to the discharge space 37 will not adversely affect the following main discharge occurs. Similarly, if the oscillation frequency is 8 kHz, the distance L should be larger than 30 mm.

Figure 2:
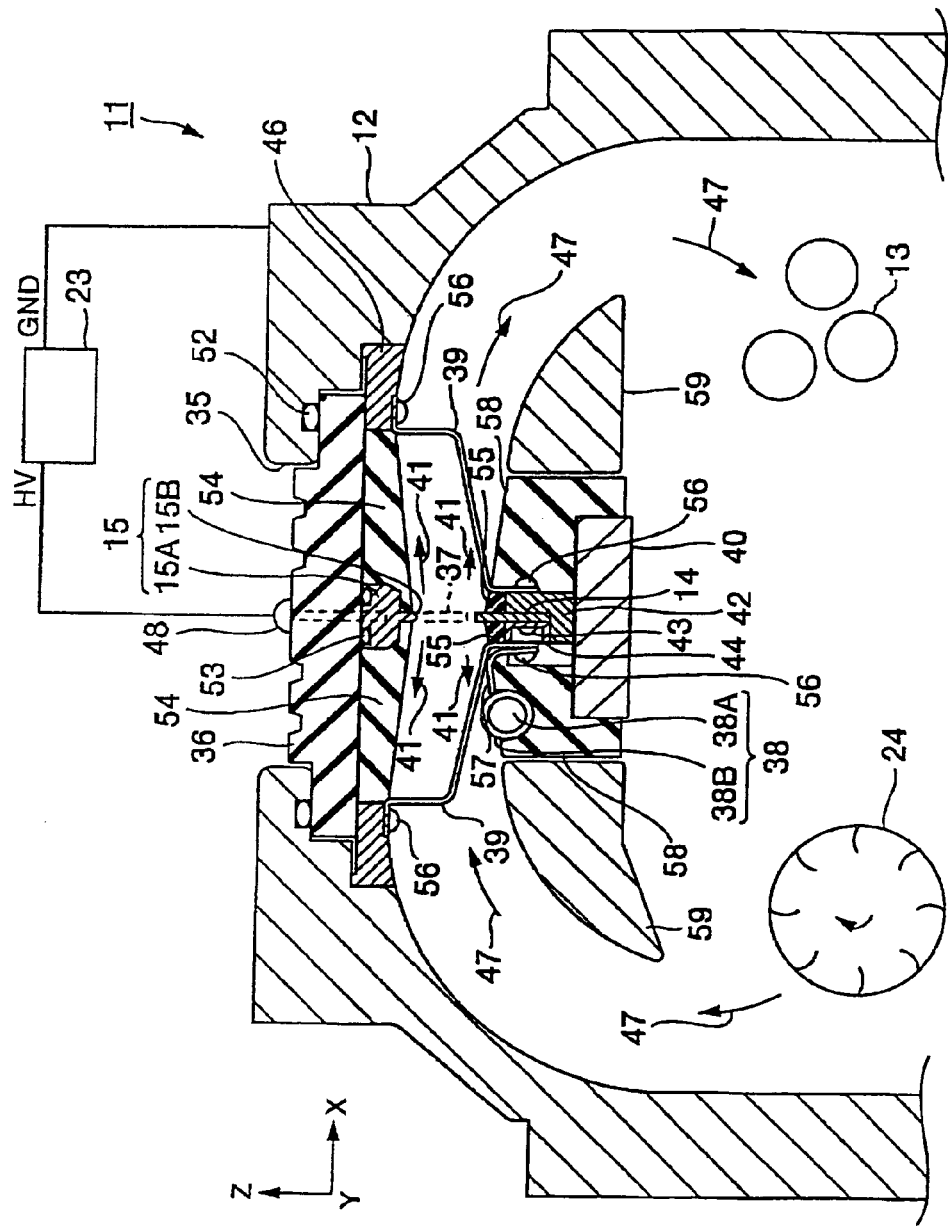
FIG. 2 is a cross-sectional view taken orthogonally to a longitudinal direction of main electrodes of an excimer laser apparatus according to an embodiment of the present invention.
Figure 3:
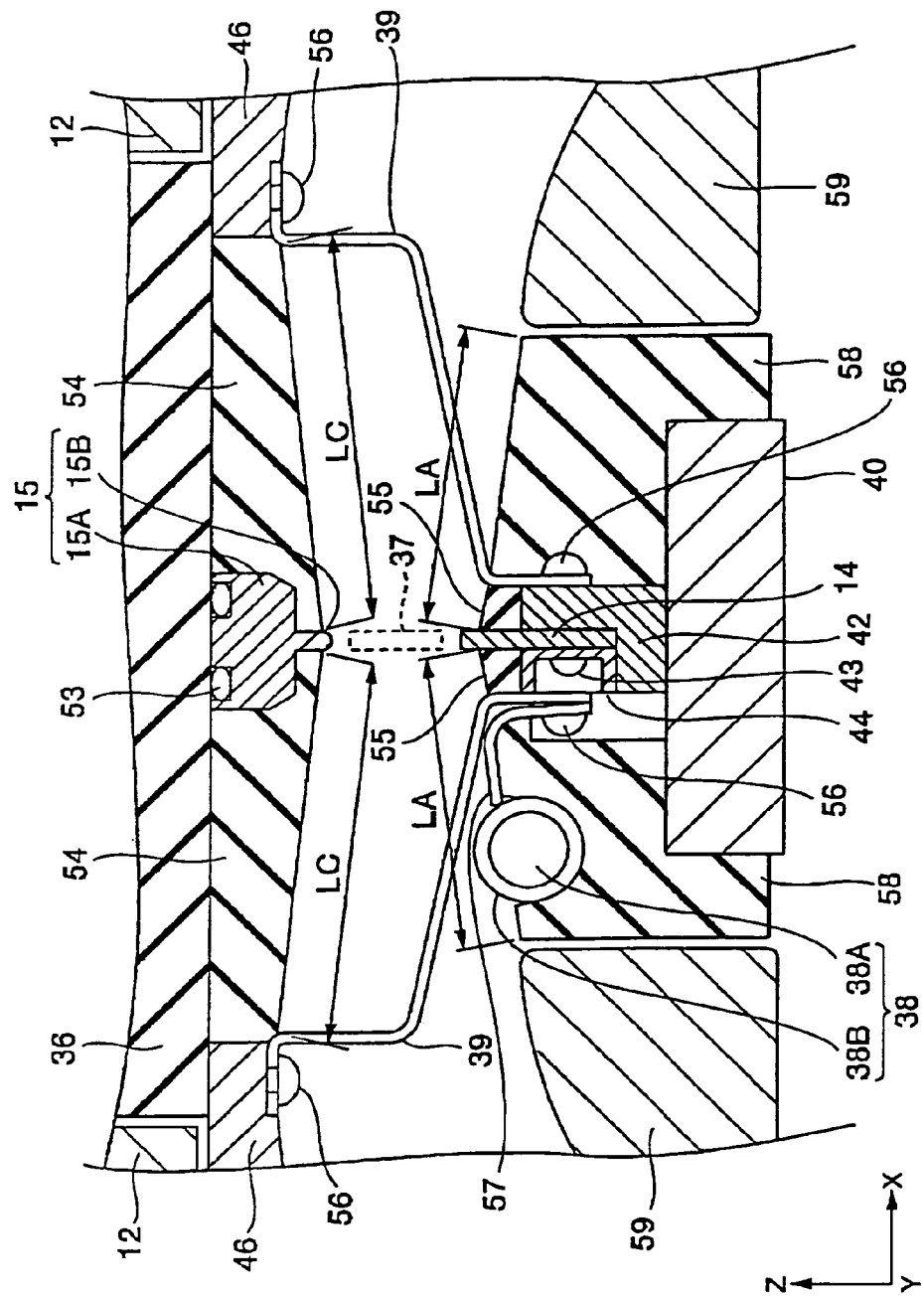
FIG. 3 is a detail cross-sectional view showing the vicinity of the discharge space in FIG. 2.

Based on the aforementioned considerations, a first embodiment will now be described. FIG. 2 is a cross-sectional view taken orthogonally to a longitudinal direction of the main electrodes 14 and 15 of an excimer laser apparatus 11 according to the embodiment, and FIG. 3 is a detail illustration showing the vicinity of the discharge space 37. In FIGS. 2 and 3, the excimer laser apparatus 11 has a laser chamber 12 hermetically enclosing a laser gas which contains, for example, fluorine (F2), argon (Ar), and neon (Ne) at prescribed pressure ratios. In the interior of the laser chamber 12, a pair of main electrodes 14, 15 including a metallic anode 14 and cathode 15 are arranged above and below the discharge space 37 so as to face each other across the same. A pulsed main discharge is produced in the discharge space 37 by applying a high voltage between the main electrodes 14 and 15 from a high voltage power supply 23. The laser gas is thereby excited to generate pulsed laser light in the vertical direction to the plane of paper in FIGS. 2 and 3.

In the interior of the laser chamber 12, there are provided a crossflow fan 24 for circulating the laser gas within the laser chamber 12 and feeding the laser gas into the discharge space 37, and a heat exchanger 13 for cooling the laser gas heated by an electric discharge, at prescribed positions, respectively (see FIG. 2). The laser gas flows in the discharge space 37 from the left to the right as viewed in FIGS. 2 and 3 and indicated by arrows 47. Hereafter, the left side of the discharge space 37 in FIGS. 2 and 3 shall be referred to as the "upstream side", and the right side as the "downstream side".

As shown in FIGS. 2 and 3, a chamber opening 35 is provided at the top of the laser chamber 12 and the chamber opening 35 is closed by a cathode base 36 formed from an insulator such as ceramics. The cathode base 36 is pressed upwards as viewed in FIGS. 2 and 3 against the laser chamber 12 from the inside (lower side as viewed in FIGS. 2 and 3) of the laser chamber 12 by a cathode base presser 46, and fastened by a fastening bolt not shown in the drawings. An O-ring 52 is interposed between the laser chamber 12 and the cathode base 36 to seal the laser gas within the laser chamber 12.

The cathode 15 is fastened to the side of the cathode base 36 facing the inside of the laser chamber 12. The cathode 15 has a support portion 15A having a rod shape with rounded corners and, a discharge portion 15B having a shape of an about 2–5 mm wide plate projecting from substantially the center of the support portion 15A for about several millimeters. Although the support portion 15A and the discharge portion 15B are illustrated as being formed integrally in FIGS. 2 and 3, the discharge portion 15B may be fastened to the support portion.

The cathode 15 and the laser chamber 12 are electrically insulated from each other by the cathode base 36. The cathode base 36 has a plurality of high-voltage feed rods 48 which are arranged at specified intervals in the longitudinal direction to pass through cathode base 36 and reach the cathode 15. The high-voltage feed rods 48 are connected to the high voltage side HV of the high voltage power supply 23 via a discharge circuit not shown in the drawings, whereby high-voltage current is supplied to the cathode 15. An O-ring 53 is provided to seal between the high-voltage feed rod 48 and the cathode base 36.

Cathode insulating members 54, 54 made of alumina ceramics or the like are respectively fastened to the upstream side and downstream side of the cathode 15 on the face of the cathode base 36 facing inside of the laser chamber 12, by means of bolts or the like not shown in the drawings. As shown in FIGS. 2 and 3, the cathode insulating members 54, 54 have inner surfaces inclined to the upstream and downstream sides, respectively, such that they are highest at the ends adjacent to the cathode 15. The expression used in the description above that they are highest at the ends adjacent to the cathode 15 means that, as shown in FIGS. 2 and 3, the design is such that the passage through which the laser gas 47 flows is narrowest in the discharge space 37 and becomes gradually wider towards the upstream and downstream sides. Further, the cathode insulating members 54, 54 cover the support portion 15A of the cathode 15, whereby the broadening of the electric field distribution is suppressed and the main discharge is stabilized. This is because the equipotential surfaces approximate to parallel on the left and right sides of the cathode 15, in comparison when no support portion 15A is provided. The discharge portion 15B projects to the side of the discharge space 37, about 1 to 3 mm from the cathode insulating members 54, 54.

The anode 14 facing the cathode 15 is formed of a plate-shaped metal with a width of about 2 to 5 mm. The anode 14 is fastened to a metallic anode holder 42 by an anode fastening screw 43 with a metallic anode presser 44 interposed therebetween. The anode holder 42 is mounted on a metallic anode base 40.

A plurality of return plates 39, 39 each having a shape of several millimeter wide plate are respectively arranged on the upstream and downstream sides of the discharge space 37 at prescribed intervals in the longitudinal direction. The upper parts of the return plates 39, 39 are fastened to the cathode base presser 46 with return plate fastening screw 56, 56. Whereas, the lower parts of the return plates 39, 39 are fastened to the anode holder 42 with return plate fastening screw 56, 56. The laser chamber 12 is connected to the ground side GND of the high voltage power supply 23 via a discharge circuit not shown in the drawings. Further, the anode 14, anode holder 42, anode presser 44, and anode base 40 are at the same potential (ground potential) as the laser chamber 12 due to the presence of the return plate 39, 39.

First anode insulating members 55, 55 and second anode insulating members 58, 58 are arranged on the upstream and downstream sides of the anode 14. Like the cathode insulating members 54, 54, these anode insulating member 55 and 58 also have inner surfaces inclined such that they are highest at the ends adjacent to the anode 14. Guides 59 are provided on the upstream and downstream sides of the second anode insulating members, respectively, for guiding the laser gas flow 47. The guides 59 may be formed from either a metal or ceramics, as long as it has resistance to fluorine. Further, since the anode 14 and the laser chamber 12 are at the same potential, the material of the anode insulating members 55, 58 is not necessarily be limited to an insulator. However, if the downstream-side anode insulating members 55 and 58 are formed from an insulator, it is possible to prevent occurrence of arc discharge in case when the laser gas flow speed becomes insufficient on the downstream side in the discharge space 37. Further, if the upstream-side anode insulating members 55 and 58 are also formed from an insulator, the broadening of the electric field distribution can be suppressed to stabilize the main discharge in a similar manner to the case of the cathode insulating member 54.

The first anode insulating members 55, 55 and the second anode insulating members 58, 58 have substantially same inclinations. Further, the first anode insulating members 55, 55 and the second anode insulating members 58, 58 are formed in close contact with each other so that the first and second insulting members 55 and 58 define a substantially same plane and do not form a gap therebetween except the part where the return plate 39 is interposed. The first anode insulating members 55, 55 and second anode insulating members 58, 58 form a widening angle of about 10 to 30 degrees with the cathode insulating members 54, 54. If they are parallel, for example, the shock waves 41 will become standing waves between the insulating members 54, 55, 58 which require a long period of time to attenuate, and thus the discharge space 37 and the laser gas flow may be disturbed. Whereas, if the widening angle is too large, a pressure drop may occur in the laser gas flow, leading to the decrease of flow speed or turbulence, and thus the main discharge may be disturbed.

The upstream-side second anode insulating member 58 has a preionization electrode 38 composed of a metallic bar-shaped internal electric conductor 38A and a dielectric 38B surrounding the outer periphery thereof, embedded therein substantially in parallel with the anode 14. The internal electric conductor 38A is connected, at an end thereof, to the high-voltage side HV of the high voltage power supply 23 by connection means not shown in the drawings. The lower end of the upstream-side return plate 39 and the base end of an external backup electrode 57 made of a metallic plate are clamped together by means of the aforementioned return plate fastening screw 56. The distal end of the external backup electrode 57 is arranged along the surface of the second anode insulating member 58, and the tip end is in contact with the dielectric 38B of the preionization electrode 38. Since the external backup electrode 57 is also at the ground potential like the laser chamber 12, if a high voltage is applied from the high voltage power supply 23 to between the high voltage side HV and the ground side GND, a corona discharge is generated between the external backup electrode 57 and the internal electric conductor 38A, and the discharge space 37 is preionized. Then, a main discharge is generated between the main electrodes 14 and 15 to produce laser light 21.

Along with this generation of the pulsed main discharge, shock waves 41 are produced from the discharge space 37. The shock waves 41 pass through between the first anode insulating members 55, 55 and second anode insulating members 58, 58 and the cathode insulating members 54, 54 and spread towards the upstream and downstream sides. In the first embodiment, the surfaces of the insulating members 54, 55, and 58 facing the discharge space 37 are formed to be free of projections or irregularities. If there exist any projections or irregularities, these will serve as a reflector to reflect and return the shock waves 41 to the discharge space 37. According to such configuration of the present embodiment, the shock waves 41 will not be reflected by the insulating members 54, 55, and 58. The shock waves will be reflected by some sort of reflector and return to the discharge space 37 only after the shock waves reach outside of the outer end of the space sandwiched by the insulating members 54, 55, and 58.

According to the first embodiment, the distance of the surface of each of the cathode insulating members 54, 54 facing the discharge space 37 in the beam cross-sectional plane (hereafter to be referred to as "surface distance") LC is set to satisfy the following expression 3. The foregoing definitions apply to the oscillation frequency $\tau$ and the velocity V of shock waves 41.

$$LC > V/(2/\tau) \qquad (3)$$

The sum LA of the surface distances of the first anode insulating member 55 and second anode insulating member 58 is also set to satisfy the following expression 4.

$$LA > V/(2/\tau) \qquad (4)$$

Since there is no projection or irregularity on the surfaces of the insulating members 54, 55, 58 and there exits no reflector, the distance L to the reflector is greater than the surface distances LC, LA of the insulating members 54, 55, 58. As the result, the chance is reduced that the shock waves 41 return to the discharge space 37 before the following main discharge occurs, and thus the influence exerted by the shock waves 41 on the discharge space 37 can be reduced. In the configuration adopted here, the dielectric 38B projecting from the surface of the second anode insulating member 58 serves as a reflector. However, the dielectric 38B cannot be separated further apart from the discharge space 37 if the laser gas in the discharge space 37 should be preionized sufficiently by the aforementioned corona discharge. Therefore, the configuration according to the present embodiment is characterized in that reflectors other than the preionization electrode 38 are reduced as much as possible to minimize the returning shock waves 41 reflected by such reflectors before the following main discharge occurs.

As shown in FIGS. 2 and 3, the distance from the discharge space 37 to the return plates 39 is shorter than the surface distance LA. Therefore, in the part where the return plate 39 is present in the longitudinal direction, the shock waves 41 may be reflected by the return plates 39 and return to the discharge space 37. However, the return plates 39 are a plate with a width of a few millimeters (e.g. 0.9 to 2 mm) and are formed at prescribed intervals in the longitudinal direction. Therefore, in the longitudinal direction, the part where there are no return plates 39 occupies a much larger area than the part where there are return plates 39. As described before, the beam profile, the beam divergence, the spectral line, width and the like of laser light 21 emitted from the laser chamber 12 can be obtained by integrating, along the longitudinal direction, the beam properties in the beam cross-sectional plane perpendicular to the optical axis. Accordingly, disturbance of the beam profile, beam divergence, spectral line width or the like due to the influence of the shock waves 41 reflected by the return plates 39 and returning to the discharge space 37 can be cancelled substantially totally by the part where there are no return plates 39 and the discharge space 37 is not disturbed.

As described so far, according to the first embodiment, the surfaces of the insulating members 54, 55, and 58 are rendered smooth at least for the stretch corresponding to the surface distances LA and LC from the discharge space 37 satisfying the expression 3 and 4. As the result, the chance is reduced that the shock waves 41 are reflected by the insulating members 54, 55, 58 and return to the discharge space 37 before the following main discharge occurs, and thus the disturbance in the discharge space 37 during the following main discharge occurs can be reduced.

A technique for preventing the occurrence of creeping discharge between the cathode 15 and the laser chamber 12 in the first embodiment will now be described. When a main discharge is generated, an electric discharge called creeping discharge not contributing to oscillation of laser light 21 is sometimes produced between the cathode 15 and the laser chamber 12. The creeping discharge impedes the main discharge, and hence the production thereof should be prevented.

A creeping discharge occurs, creeping along the surfaces of the cathode insulating members 54, 54. It is known that the creeping discharge is apt to occur if the insulation distance D between the cathode 15 and the laser chamber 12 or a metallic member attached thereto as measured along the surface of the cathode insulating member 54 is not more than three times of the distance between the main electrodes 14 and 15, namely between the cathode 15 and the anode 14. In the embodiment as shown in FIGS. 2 and 3, the insulation distance D corresponds to the distance between the cathode 15 and the cathode base presser 46, and substantially matches the surface distance LC of the cathode insulating member 54. Accordingly, the surface distance LC of the cathode insulating members 54, 54 needs be at least three times of the distance between the main electrodes 14 and 15.

When the oscillation frequency is 4 kHz, for example, an allowable range can be obtained from the expression 3 that the surface distance LC should be larger than 60 mm. In order to prevent the aforementioned creeping discharge, if the distance between the main electrodes is 16 mm for example, the insulation distance D (=surface distance LC) should be larger than three times of 16 mm, namely larger than 48 mm. In this case, the surface distance LC needs be larger than 60 mm to satisfy the expression 3.

Whereas, when the oscillation frequency is 8 kHz, an allowable range can be obtained from the expression 3 that the surface distance LC should be larger than 30 mm. However, in order to prevent the aforementioned creeping discharge, if the distance between the main electrodes is 16 mm for example, the insulation distance D (=surface distance LC) should be larger than three time of 16 mm, namely larger than 48 mm. This means that the lower limit (30 mm) based on the expression 3 for decreasing the shock waves 41 or the lower limit (48 mm) required for preventing the creeping discharge, whichever larger should be selected as the lower limit of the surface distance LC. Accordingly, in this case, the surface distance LC needs be larger than 48 mm.

Figure 4:
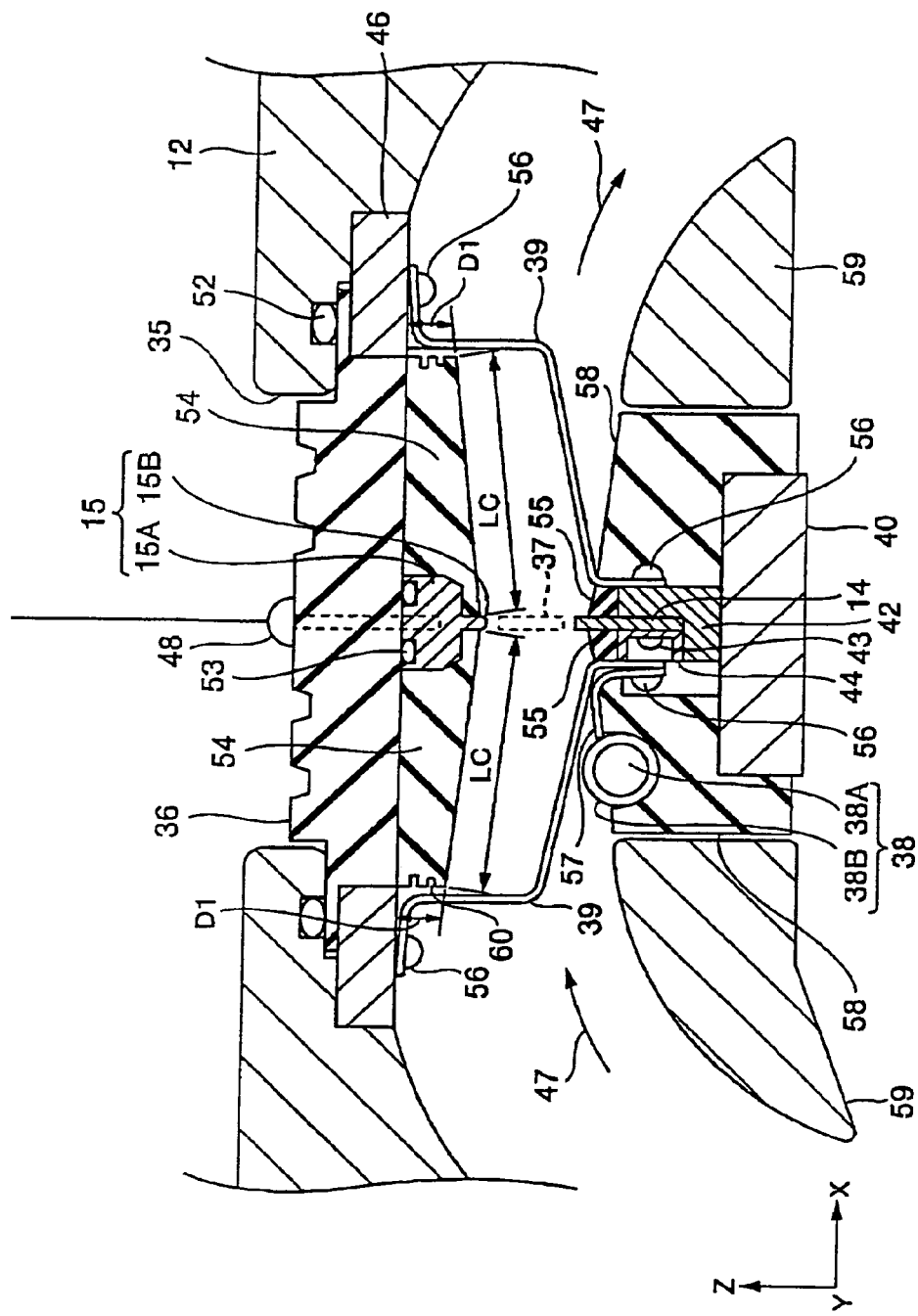
FIG. 4 is a cross-sectional view showing another example of configuration of the vicinity of a discharge space according to the present invention.

FIG. 4 shows another example of configuration in the vicinity of the discharge space 37. In FIG. 4, the cathode base presser 46 is lower than the surface of the cathode insulating member 54. Therefore, the insulation distance D from the cathode 15 to the cathode base presser 46 is a value obtained by adding the distance D1 from the corner of the cathode insulating member 54 to the cathode base presser 46 to the surface distance LC of the cathode insulating member 54. Accordingly, if the oscillation frequency is 8 kHz, and the distance between the main electrodes is 16 mm, for example, the surface distance LC should be 32 mm and the distance D1 should be 18 mm. According to such arrangement, there is no reflector in the region extending from the discharge space 37 for the surface distance LC satisfying the expression 3, no shock waves 41 will be reflected. Even if they are reflected at a location farther than the surface distance LC and return to the discharge space 37, adverse effects exerted on the following main discharge occurs will be insignificant. On the other hand, since the distance D1 is 18 mm, the insulation distance D (=LC+D1) is 50 mm, which is larger than the triple (48 mm) of the distance between the main electrodes (16 mm). As the result, the creeping discharge is less apt to occur and the main discharge can be generated stably.

As described above, by projecting the surface of the cathode insulating members 54, 54, the insulation distance D can be increased while decreasing the size of the excimer laser apparatus 11. Specifically, if D>LC, the length of the cathode insulating member 54 in the lateral direction in FIG. 4 can be reduced by D1, and hence the width of the laser chamber 12 in the lateral direction can be reduced. Moreover, if insulation ribs 60 are provided for example between the corner of the cathode insulating member 54 and the cathode base presser 46, the occurrence of creeping discharge is suppressed thereby, and thus the distance D1 can be further reduced to make the apparatus more compact. Moreover, even when the insulation ribs 60 are provided in this location, the insulation ribs are hidden from the discharge space 37 by the cathode insulating members 54, 54, and thus the shock waves 41 will not be reflected by the insulation ribs 60. Further, since the insulation ribs 60 are away from the discharge space 37 by a distance no less than the surface distance LC, even if the shock waves 41 are reflected thereby, the chance is small that the reflected shock waves return to the discharge space 37 before the following main discharge occurs and disturb the discharge space 37.

Figure 5:
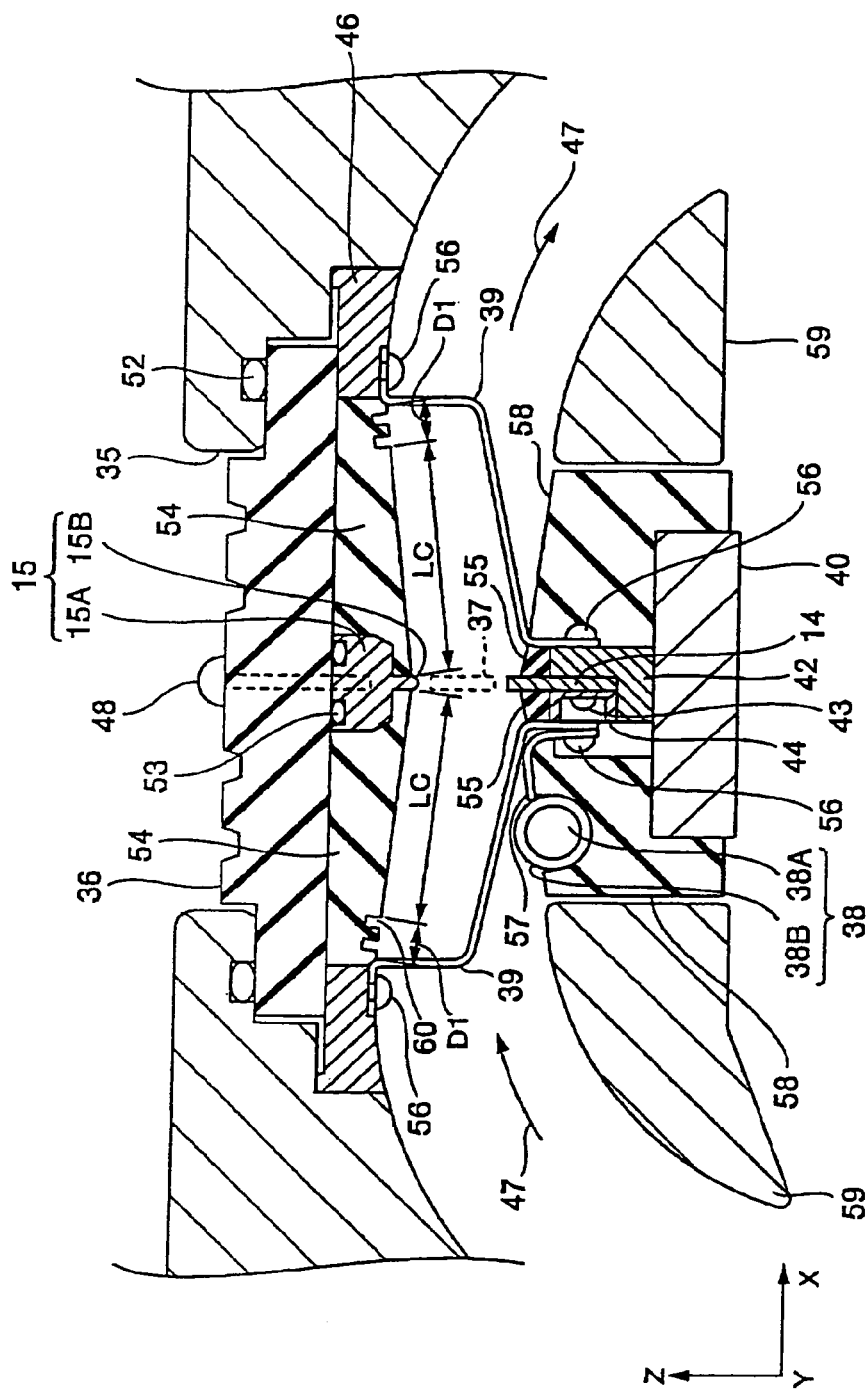
FIG. 5 is a cross-sectional view showing still another example of configuration of the vicinity of a discharge space according to the present invention.

Further, as shown in FIG. 5, the cathode insulating members 54, 54 are formed such that a region in the surface extending over a surface distance LC satisfying the expression 3 (e.g. 32 mm) from the discharge space 37 has no irregularities. Insulation ribs 60 may be provided outside of this region, for a stretch corresponding to the distance D1 (e.g. 18 mm). As the result, the distance L from the discharge space 37 to the insulation ribs 60 serving as reflectors satisfies the condition of the expression 2. Therefore, even if the shock waves 41 reflected by the insulation ribs 60 return to the discharge space 37, the chance that the following main discharge occurs is disturbed thereby will be small. Moreover, since the insulation distance D is a sum of the surface distance LC and the distance D1 (e.g. 50 mm), the creeping discharge is less apt to occur. Further, by providing the insulation ribs 60, the occurrence of creeping discharge is further suppressed. Alternatively, the distance D1 can be made smaller by the effect of the insulation ribs 60.

Although the description above has been made for the case when the oscillation frequency τ is fixed, the excimer laser apparatus may be operated at various oscillation frequencies τ such as 8 kHz or 2 kHz as when the excimer laser apparatus is used as a light source for lithography, for example. According to the expressions 2 through 4 above, the surface distances LC and LA of the insulating members should be longer as the oscillation frequency τ becomes lower. Therefore, the lower limit of the surface distances LC, LA of the insulating members is determined in accordance with the lowest envisaged oscillation frequency τ. However, it is experimentally known that, if the oscillation frequency τ is no more than 2 kHz, the influence exerted by the returned shock waves 41 on the beam profile is extremely small. Accordingly, if the oscillation frequency τ of 2 kHz is substituted into expression 2, it is found that the influence exerted by the shock waves 41 on the discharge space 37 can be reduced at any oscillation frequency τ by rendering the surface distances LC, LA of the insulating members larger than 120 mm.

Further, in the description above, the calculation has been based on the assumptions that the laser gas is mostly composed of neon and the acoustic velocity V is 460 m/sec. However, if the laser gas is mostly composed of helium as in the case of a fluorine molecular laser apparatus, for example, the acoustic velocity V becomes 900 m/sec. Accordingly, the lower limit of the surface distances LC, LA of the insulating members 54, 55, 58 in this case is about two times larger than that when the most of the laser gas is neon, and hence larger insulating members 54, 55, 58 are required.

Figure 6:
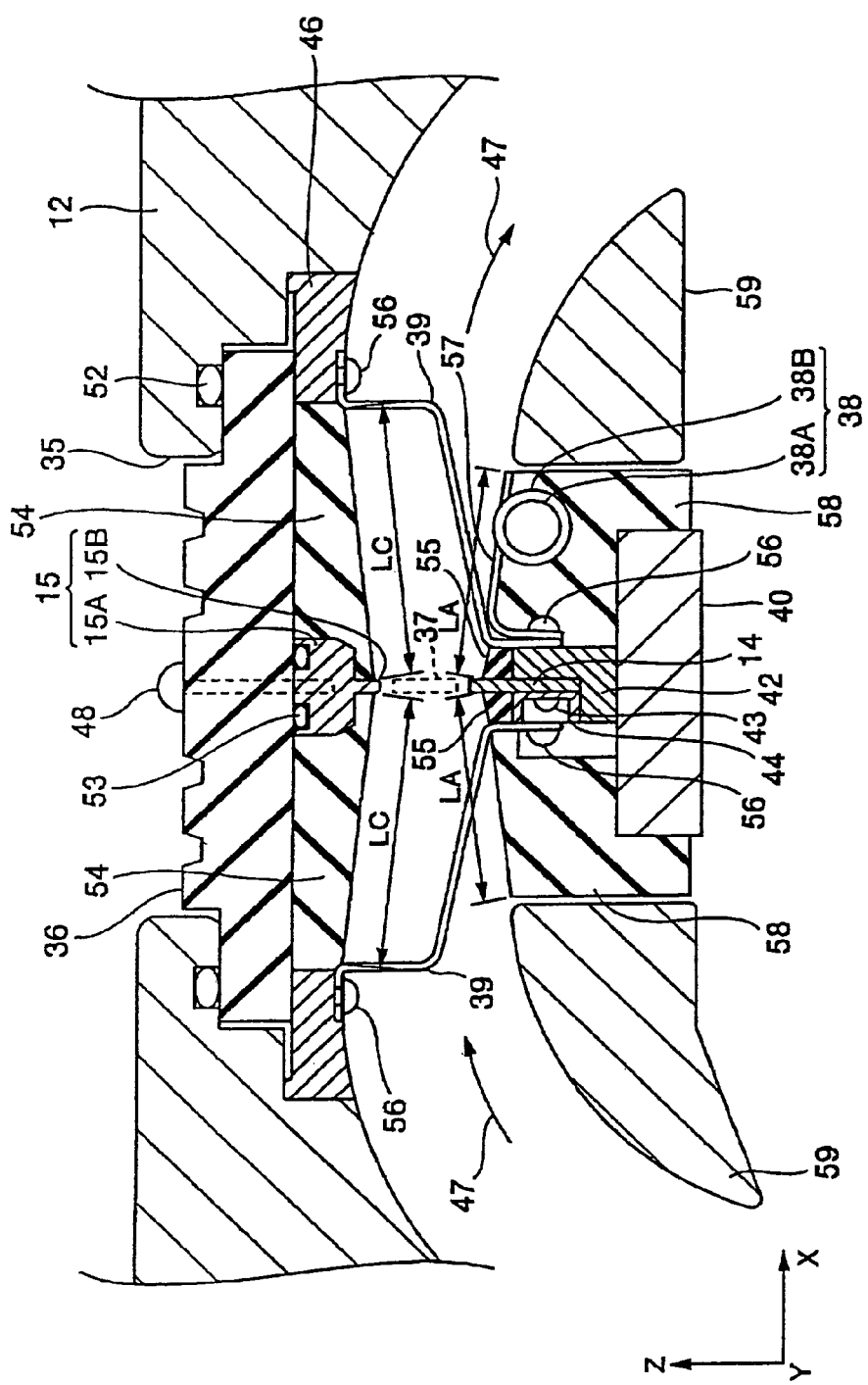
FIG. 6 is a cross-sectional view showing an example of configuration where the position of a preionization electrode is modified according to the present invention.
Figure 7:
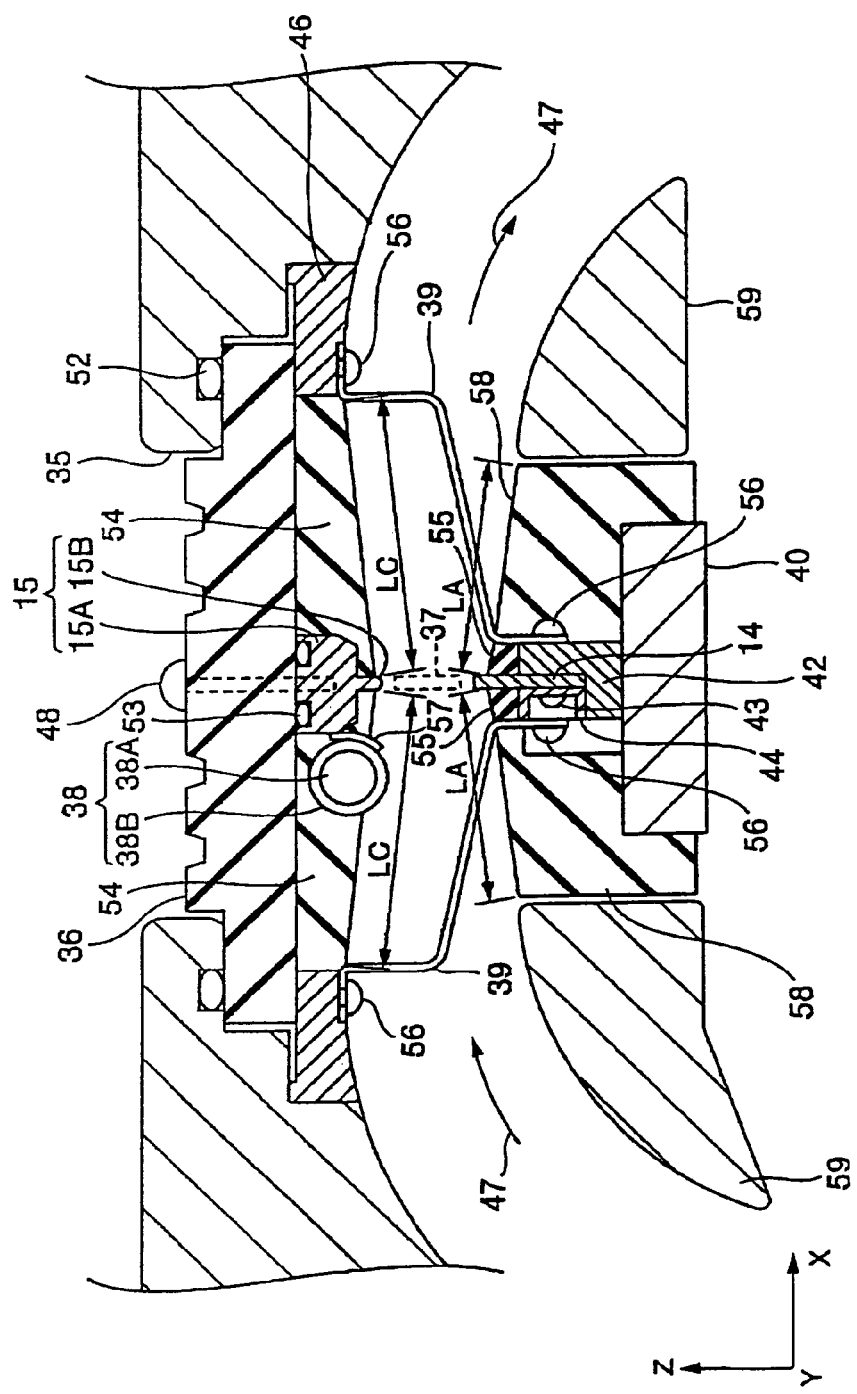
FIG. 7 is a cross-sectional view showing another example of configuration where the position of a preionization electrode is modified according to the present invention.

FIGS. 6 and 7 show examples of configurations with varied positions of the preionization electrode 38. As shown in FIG. 6, the preionization electrode 38 may be arranged on the downstream side. Further, the preionization electrode 38 may be arranged on both the upstream and downstream sides. Still further, as shown in FIG. 7, the preionization electrode 38 may be embedded in the cathode insulating member 54. In this case, the internal electric conductor 38A is connected to the ground side GND of the high voltage power supply 23 by means of connecting means not shown in the drawings. The external backup electrode 57 is connected to the cathode 15. Also in this case, the preionization electrode 38 may be arranged on the both upstream and downstream sides of the cathode 15, or on either one side of the cathode 15.

Figure 8:
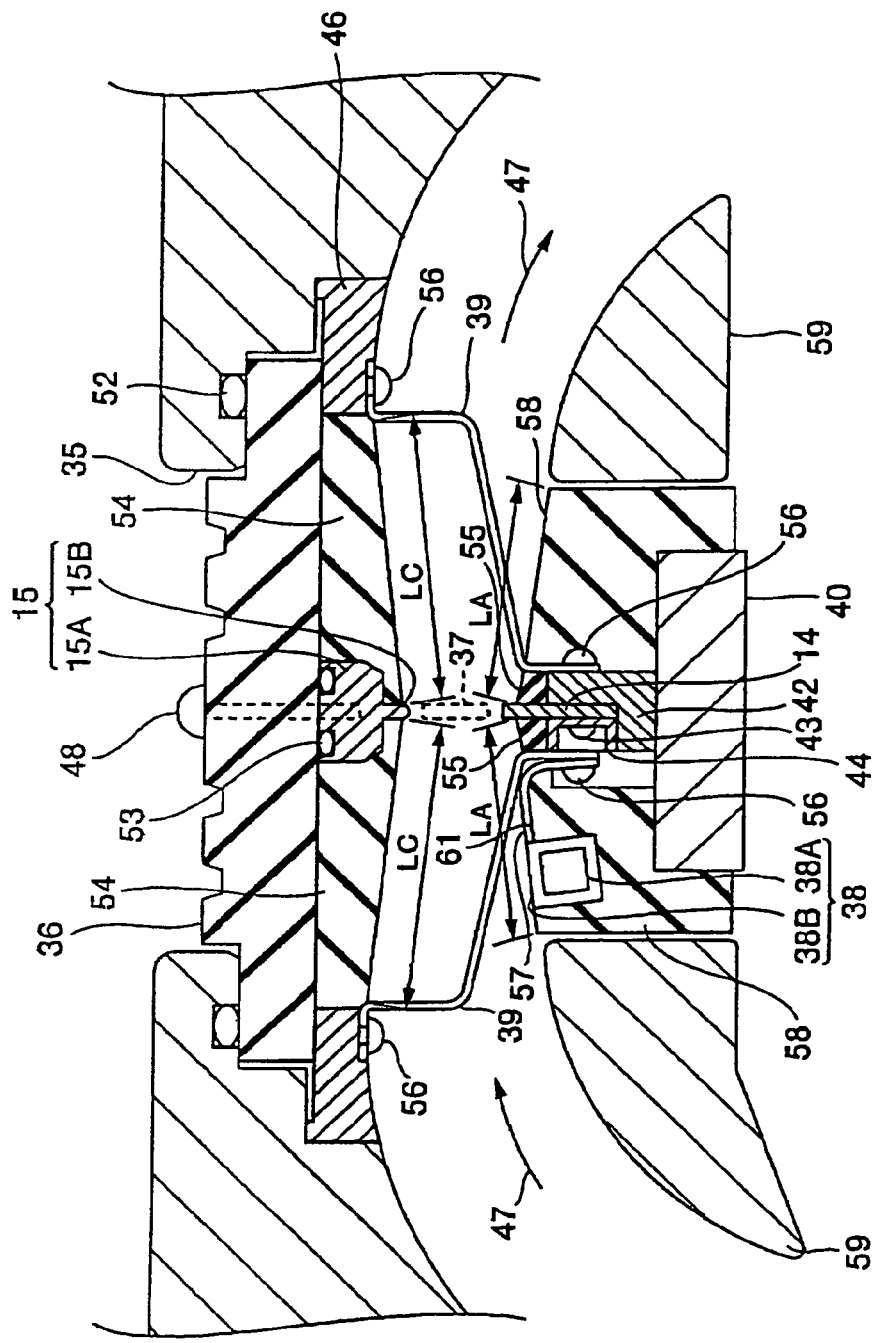
FIG. 8 is a cross-sectional view showing the vicinity of a discharge space according a second embodiment of the present invention.

A second embodiment will now be described. In the first embodiment, the preionization electrode 38 is arranged on the upstream of the anode insulating member so as to protrude therefrom. Since the distance between the discharge space 37 and the preionization electrode 38 is smaller than the surface distance LA, there is a possibility that shock waves 41 reflected by the preionization electrode 38 return to the discharge space 37 before the following main discharge occurs and disturb the discharge space 37. FIG. 8 shows an example of configuration of the vicinity of the discharge space 37 according to the second embodiment. In FIG. 8, the preionization electrode 38 is formed in a prismatic shape, and is embedded in the anode insulating member 55, 58 such that the surface of the preionization electrode 38 is substantially flush with the surface of the anode insulating member 55, 58. According to such configuration, the chance that the shock waves 41 are reflected by the preionization electrode 38 is reduced and thus disturbance of the discharge space 37 by the reflected shock waves is also reduced. Further, a groove 61 is formed in the surface of the anode insulating member 55, 58 to a depth substantially same as the thickness of the external backup electrode 57, and the external backup electrode 57 is embedded in this groove. This configuration further reduces the irregularities present in the region where shock waves are propagated, and hence the chance that the shock waves 41 are reflected by the external backup electrode 57 is also reduced.

Figure 9:
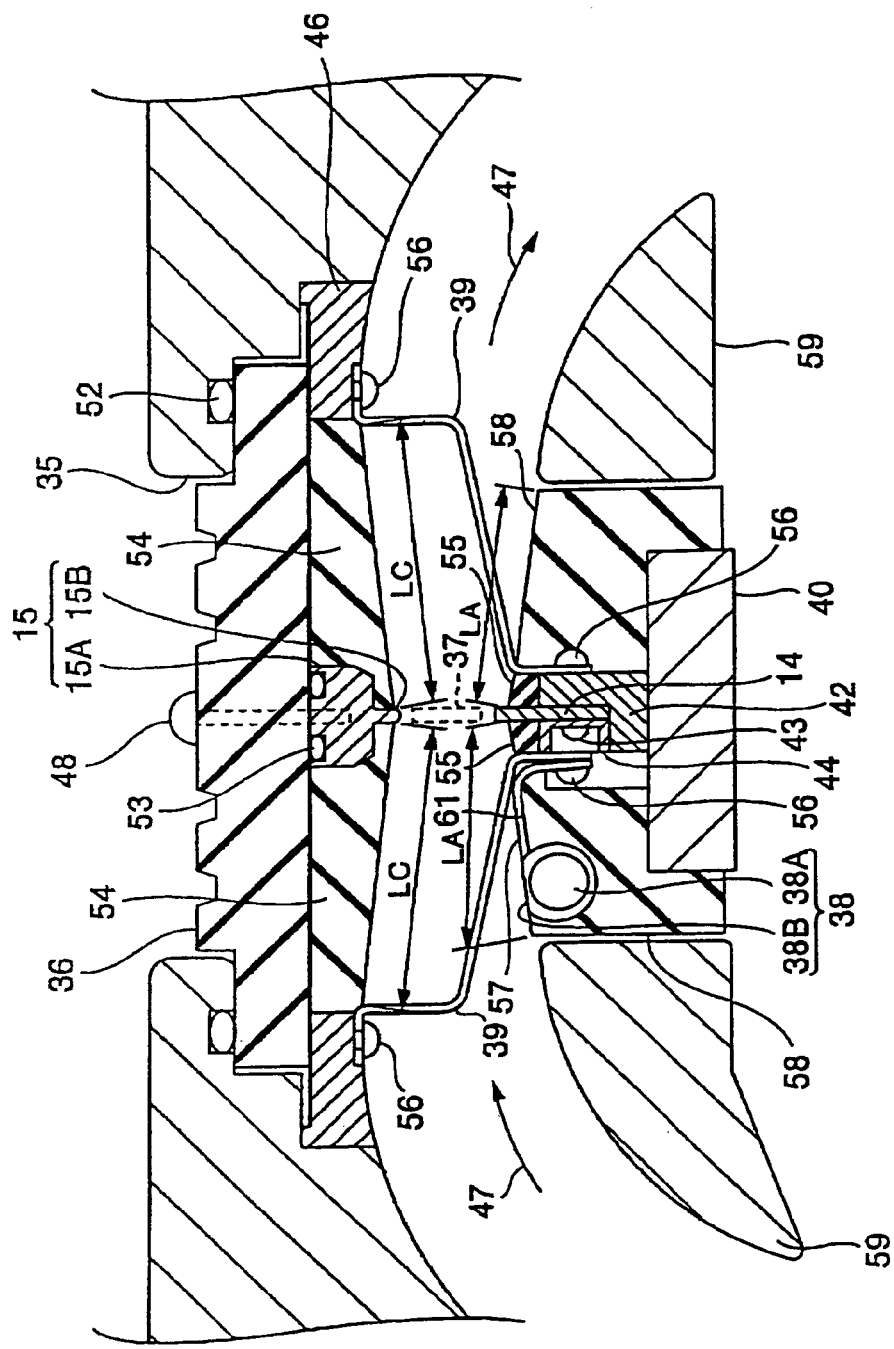
FIG. 9 is a cross-sectional view showing another example of configuration of a preionization electrode according to the present invention.

FIG. 9 shows another example of configuration of a preionization electrode 38 according to the second embodiment. In FIG. 9, the preionization electrode 38 is formed by arranging a cylindrical internal electric conductor 38A eccentrically with respect to a cylindrical dielectric 38B, and the part of the dielectric 38B with a comparatively larger thickness is removed to form a flat face in the dielectric 38B. The preionization electrode 38 is embedded in the anode insulating member 55, 58 such that this flat face is exposed on and flush with the surface of the anode insulating member 55, 58, whereby a reflector is eliminated and the reflection of the shock waves 41 is reduced. By using such manufacturing method of removing a part of the cylindrical dielectric 38B, the manufacture is rendered easier in comparison with the case of a prismatic dielectric 38B when alumina ceramics is used for the dielectric 38B. If the resultant thickness of the removed part of the dielectric 38B is sufficient, the internal electric conductor 38A needs not necessarily be arranged eccentrically with respect to the dielectric 38B.

As described so far, according to the second embodiment, the dielectric 38B of the preionization electrode 38 is partially flat, and the preionization electrode 38 is embedded in the anode insulating member 55, 58 so as to produce no irregularity on the surface. Therefore, there is a little chance that the shock waves 41 are reflected by the preionization electrode 38 and the discharge space 37 is disturbed. Further, a groove 61 is formed in the anode insulating member 55, 58 so that the external backup electrode 57 is embedded therein. Thus, the external backup electrode 57 hardly reflects the shock waves 41, and the discharge space 37 is hardly disturbed. Although the description above has been made for the case in which the preionization electrode 38 is embedded on the upstream side of the anode insulating member 55, 58, the preionization electrode 38 may be embedded in the cathode insulating member 54, and similarly to the first embodiment, it may be embedded in the downstream side or on both the upstream and downstream sides.

A third embodiment will now be described. In relation to the first and second embodiments, it has been described that the insulating members have no irregularity on the surface thereof. Here, it will be considered how much irregularity is allowable. It has been proved by measurements using a high-frequency microphone that the frequency component of shock waves 41 generated by a main discharge has a peak around 50 kHz. This means that since these shock waves 41 exhibit an acoustic velocity V of about 460 m/sec within ArF laser gas, the wavelength $\lambda$ (=V/f) of the shock waves 41 is about 9.2 mm.

It is known that shock waves 41 mutually interfere and are amplified when impinging on a reflector having a size corresponding to a quarter of the wavelength thereof. The size of a reflector causing such amplification of shock waves 41 will be 2.3 mm. Accordingly, reflection of the shock waves 41 can be reduced by rendering the size of the reflector smaller than 2.3 mm. In practice, the frequency component f of the shock waves 41 has a frequency component higher than 50 kHz. Also, even if the reflector is smaller than a quarter of the wavelength, a certain level of reflection will occur. Therefore, a computer simulation was conducted to determine how small the reflector should be for reducing the influence of reflected shock waves 41 to a negligible level.

Figure 10:
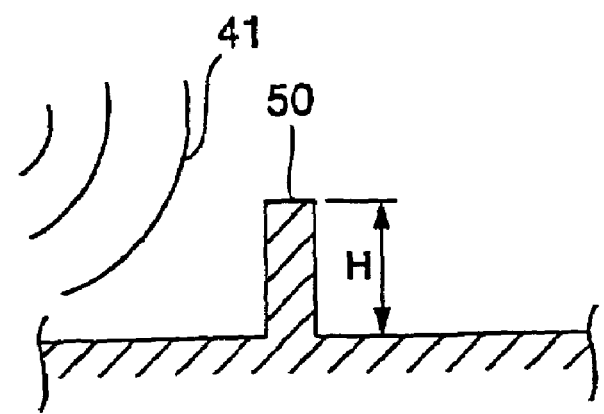
FIG. 10 is an illustration showing an example of a reflector according to a third embodiment of the present invention.
Figure 11:
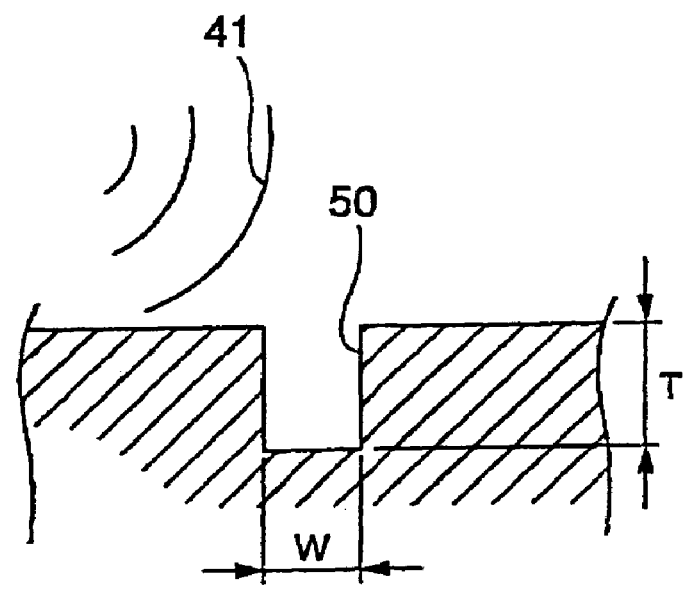
FIG. 11 is an illustration showing an example of a reflector according to the present invention.

Description will now be made on a size of a reflector. FIG. 10 shows an example of a reflector 50. In FIG. 10, the reflector 50 projects from the plane to a height H. According to the computer simulation, in such case, if the height H is no more than 1 mm, the percentage of reflected shock waves 41 can be reduced to such a low level as exerting no adverse effects on the discharge space 37. Desirably, the height H is no more than 0.5 mm. This is because acoustic waves have a component also around 200 kHz, and at 200 kHz, the wavelength $\lambda$ is 2.3 mm and the affectable size $\lambda/4$ is 0.575 mm. FIG. 11 shows another example of a reflector 50 in which a recess with a width W and a depth T is formed like insulation ribs, for example, to serve as a reflector 50. According to the computer simulation, if the width W and the depth T are both 1 mm, a high percentage of shock waves 41 will be reflected and exert adverse effects on the discharge space 37. If one of the width W and the depth T is 1 mm and the other is 0.5 mm, for example, the percentage of the reflected shock waves 41 will be reduced and the adverse effects exerted on the discharge space 37 will also be reduced. Accordingly, it is desirable that at least one of the width W and the depth T be less than 1 mm. Preferably, both the width W and the depth T should be equal to or less than 05 mm.

Figure 12:
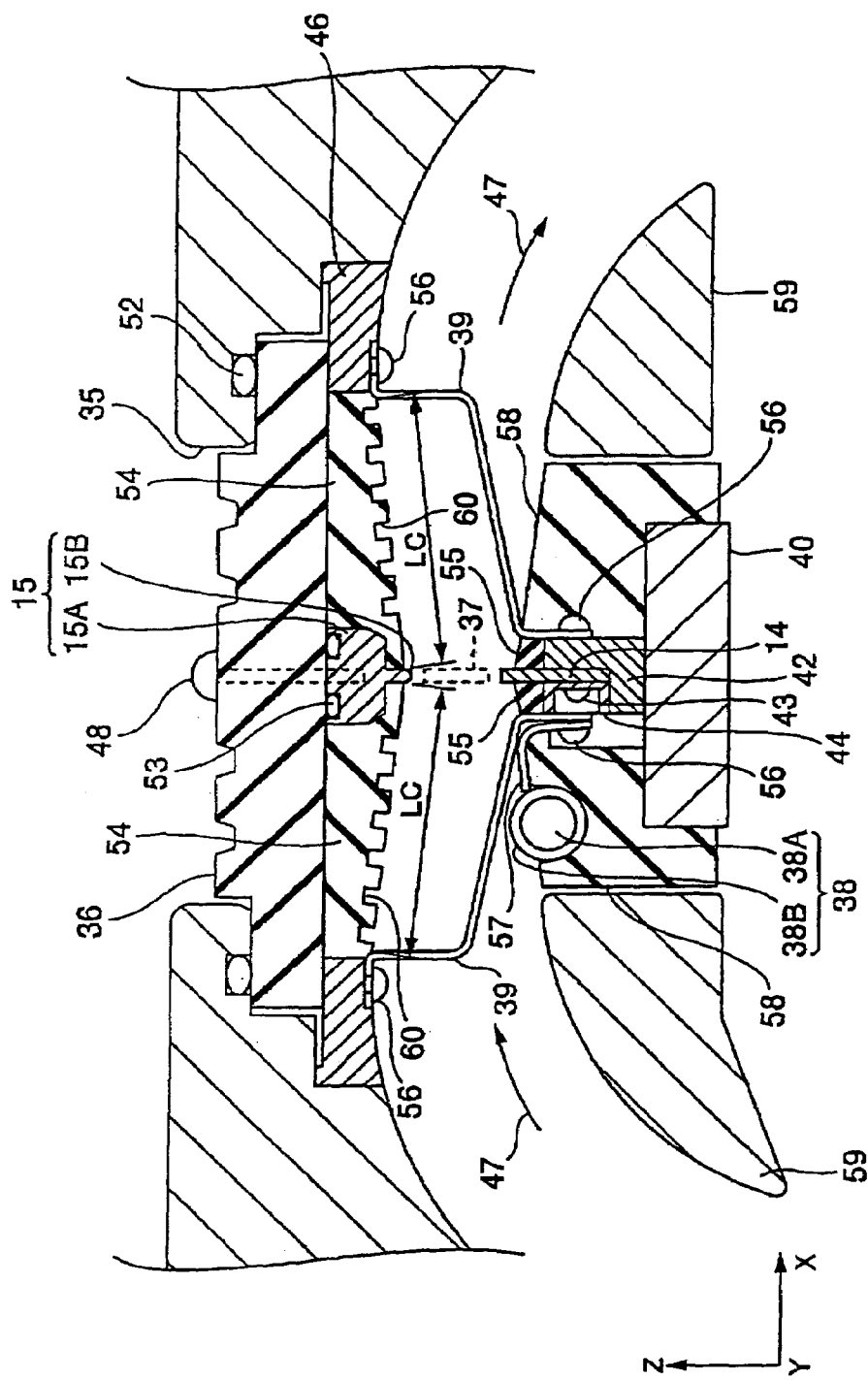
FIG. 12 is a cross-sectional view showing the vicinity of a discharge space in an excimer laser apparatus according to the third embodiment of the present invention.

FIG. 12 is a schematic diagram showing the vicinity of the discharge space 37 of a discharge excitation type laser apparatus 11 according to the third embodiment. In FIG. 12, the surface distance LC of the cathode insulating member 54 satisfy the expression 3 and insulation ribs 60 with a width of 1 mm and a depth of 0.5 mm are formed around the cathode 15. According to such configuration, reflection of shock waves 41 by the insulation ribs 60 is so small that the almost no shock waves 41 are reflected by surface of the cathode insulating member 54, and the influence to the discharge space 37 is small. The insulation ribs 60 may be formed in the surface of the cathode insulating member 54 uniformly linearly in the longitudinal direction perpendicular to the plane of paper in FIG. 12, while they may also be formed as curved grooves. More specifically, although the insulation ribs 60 are formed with such a depth and a width as to decrease the reflection of shock waves 41, the reflection of shock waves 41 will not necessarily be eliminated totally. If the insulation ribs 60 are formed in a curved shape, the disturbance of the discharge space 37 due to the reflection of the shock waves 41 is integrated and homogenized along the longitudinal direction more easily, and the influence exerted by the shock waves 41 on the beam profile can be reduced further. Moreover, since the shock waves 41 are reflected by the reflector 50 only after passing through the surface distance LC satisfying the expression 3, the influence exerted by the reflected shock waves 41 on the discharge space 37 is not significant. By providing the cathode insulating member 54 with the insulation ribs 60, the insulation distance D between the cathode 15 and the laser chamber 12 or a metallic member attached thereto is increased and thus the occurrence of creeping discharge is suppressed. Further, when the cathode insulating member 54 is formed flat and D is larger than LC, the width of the laser chamber 12 in the lateral direction of FIG. 12 can be made smaller.

Figure 13:
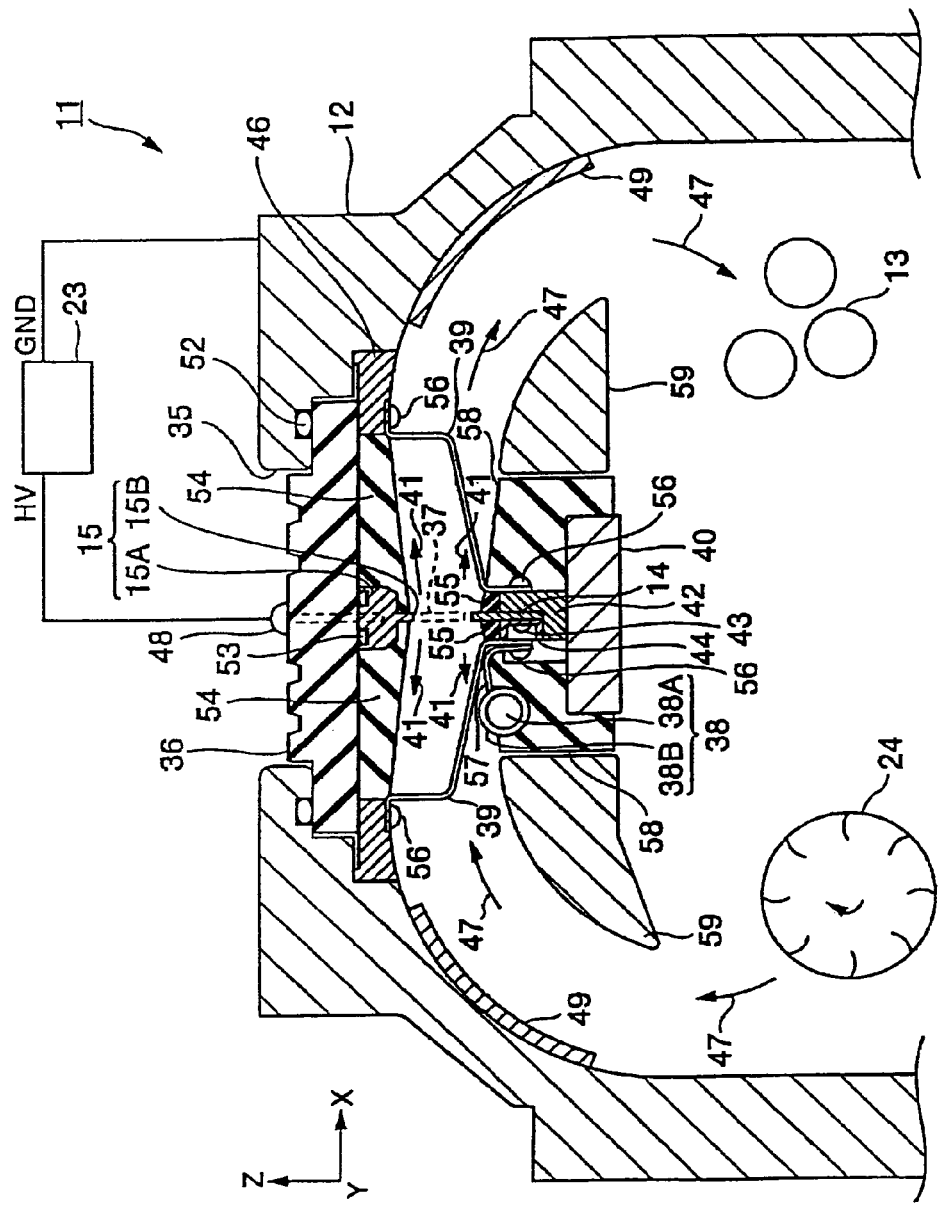
FIG. 13 is a cross-sectional view showing the vicinity of a discharge space in an excimer laser apparatus according to a fourth embodiment of the present invention.
Figure 14:
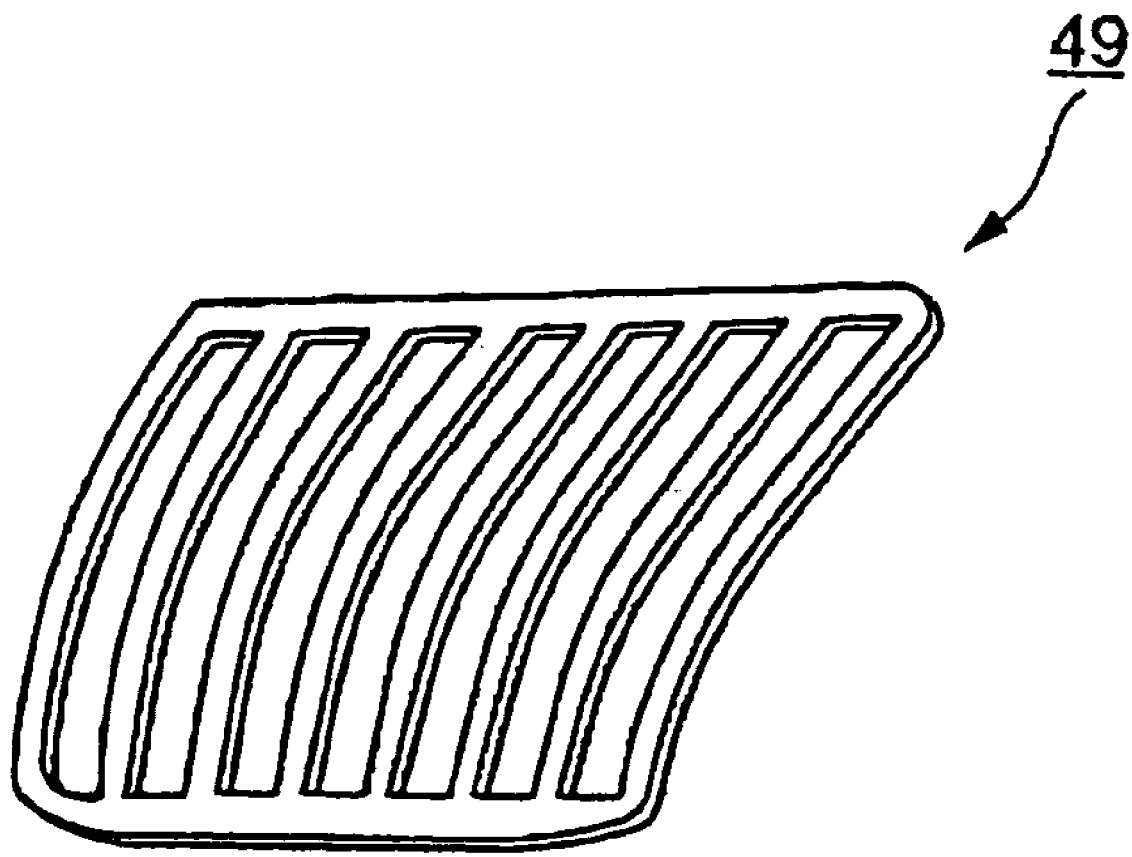
FIG. 14 is an illustration showing an example of a shock wave absorbing member according to the present invention.

A fourth embodiment will be described next. Most of the shock waves 41 passing through the space sandwiched between the insulating members 54, 55, and 58 reach the inner walls of the laser chamber 12 and remain within the laser chamber 12 while being repeatedly reflected, and may eventually return to the discharge space 37. In order to prevent this, according to the fourth embodiment, a shock wave absorbing member 49 for absorbing shock waves 41 is mounted on the inner walls of the laser chamber 12. Alternatively, a structural material 49 for reflecting irregularly and dissipating shock waves 41 is mounted thereon. FIG. 13 is a schematic diagram showing the vicinity of the discharge space 37 of an excimer laser apparatus 11 according to the fourth embodiment. In FIG. 13, a rib-shaped shock wave irregularly reflecting member 49 made from a metal or ceramics as shown in FIG. 14, for example, is attached to the inner walls of the laser chamber 12. The shock waves 41 can be irregularly reflected thereby, and thus the shock waves 41 can be prevented from remaining within the laser chamber 12. Instead of a rib-shaped member as shown in FIG. 14, a member of porous metal or porous ceramics also can be used. When such member 49 is mounted on the inner walls of the laser chamber 12, the laser gas flow will possibly be inhibited somewhat, but the effect of preventing the shock waves 41 from remaining within the laser chamber 12 is more significant.

Figure 15:
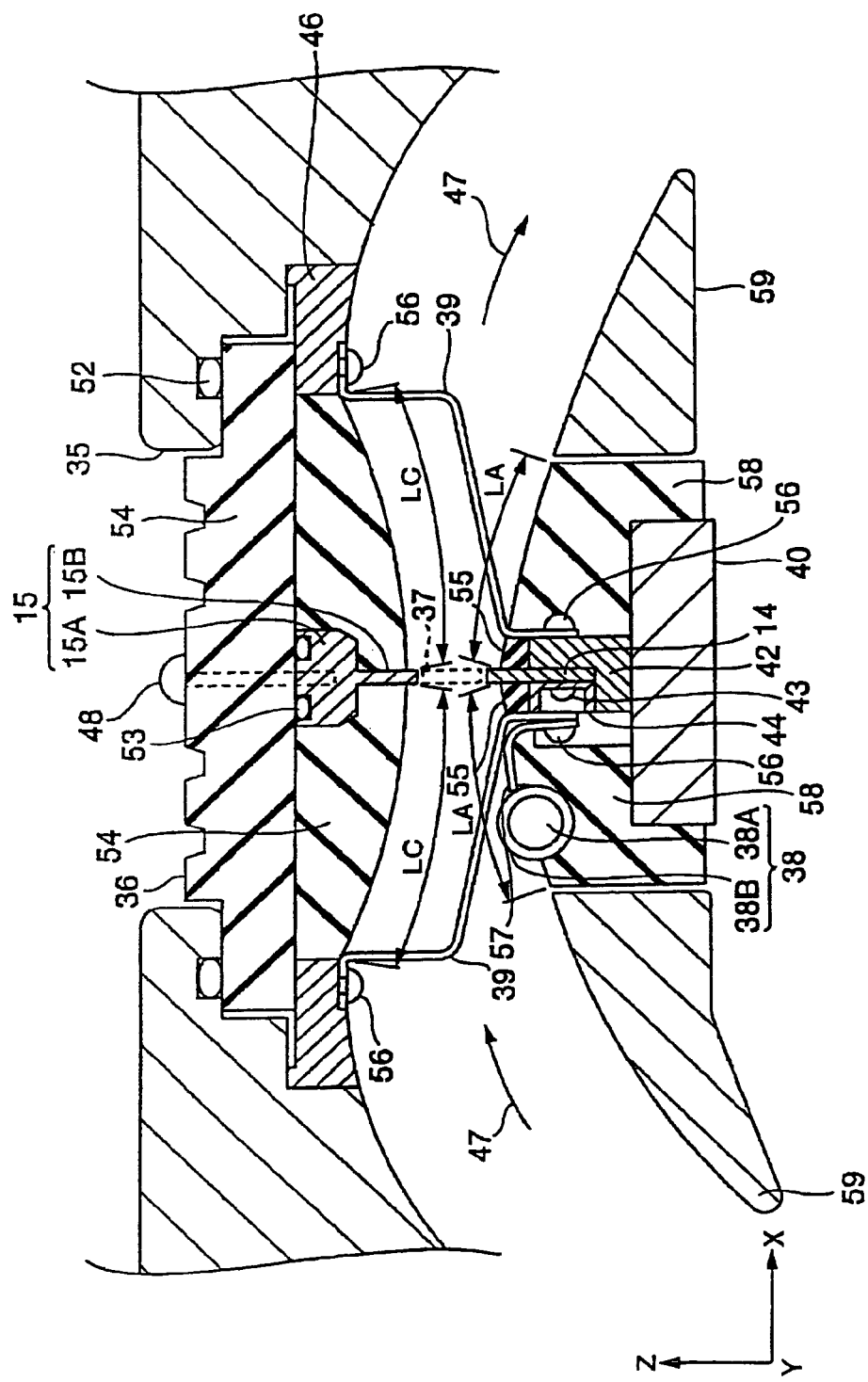
FIG. 15 is a cross-sectional view showing the vicinity of a discharge space in the excimer laser apparatus according to the fourth embodiment of the present invention.
Figure 16:
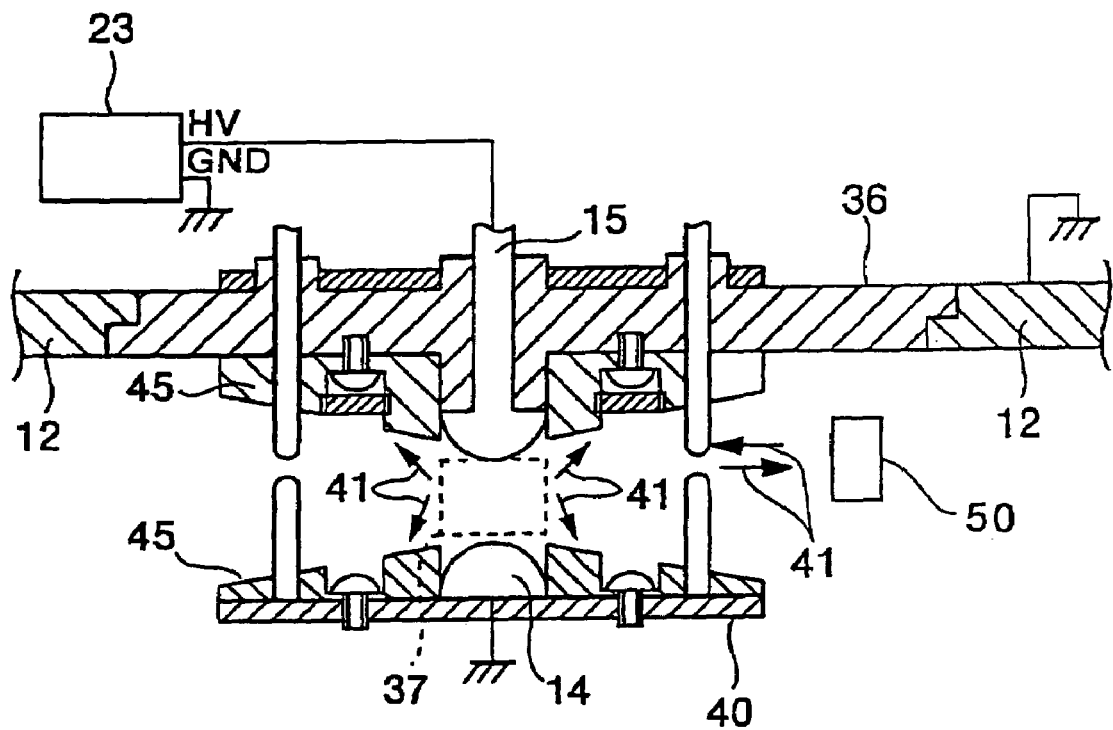
FIG. 16 is a cross-sectional view showing the vicinity of a discharge space in an excimer laser apparatus according to a conventional art.

FIG. 15 is a cross-sectional view showing the vicinity of the discharge space 37 of an excimer laser apparatus 11 according to a fifth embodiment. As shown in FIG. 15, the surfaces of insulating members 54, 55, and 58 are not inclined uniformly but are curved so that there is no irregularity therein. Also in this case, same effects as the other embodiments can be obtained by designing such that the surface distances LC and LA along the curved surfaces satisfy the expressions 3 and 4.

Although in the description of the embodiments above, the cathode base 36 and the cathode insulating member 54 are separate members, the present invention is not limited to this. They may also be formed integrally and the surface of the cathode base 36 facing the interior of the laser chamber may be formed into an inclined smooth surface without irregularities. Further, although the surface distances LA and LC of the upstream-side insulating members have been described to be substantially same as those of the downstream-side insulating members, the present invention is not limited to this, and the distances on one side may be longer than those on the other side as long as the expressions 3 and 4 are satisfied.

Further, although the description above has been made on the case where the shock waves are prevented from returning to the discharge space 37 before the following main discharge occurs, the adverse effects will be further decreased if the shock waves are prevented from returning to the discharge space 37 before the second following main discharge. For accomplishing this, the surface distances LA and LC should be determined to satisfy the following expressions 5 and 6.

$$LC > V/\tau \quad (5)$$

$$LA > V/\tau \quad (6)$$

These distances can be determined in a similar manner also for the subsequent main discharges. Further, although the description above has been made for an ArF excimer laser apparatus, the same applies to a KrF excimer laser apparatus or a fluorine molecular laser apparatus, and the surface distances of insulating members can be determined based on an acoustic velocity in the atmosphere in accordance with composition of a laser gas.

What is claimed is:

1. A discharge excitation type pulse laser apparatus designed for generating a pulsed main discharge by applying a high voltage between main electrodes including a cathode and an anode arranged in opposition to each other, and thereby exciting a laser gas in a discharge space defined between the main electrodes to oscillate laser light,
wherein no reflector other than a preionization electrode is reflecting shock waves produced by a main discharge towards the discharge spaces, said reflected shock waves making an effect on the main discharge and no reflector other than the preionization electrode is within a prescribed distance from the discharge space, the prescribed distance being a distance sufficient to ensure that, when shock waves produced by a main discharge in the discharge space are reflected by the reflector toward the discharge space, those shock waves will not return to the discharge space before the following main discharge occurs.

2. A discharge excitation type pulse laser apparatus designed for generating a pulsed main discharge by applying a high voltage between main electrodes including a cathode and an anode arranged in opposition to each other, and thereby exciting a laser gas in a discharge space defined between the main electrodes to oscillate laser light,
wherein no reflector other than a preionization electrode is larger than a prescribed size, no reflector other than the preionization electrode reflects shock waves produced by a main discharge towards the discharge space so that said shockwaves have an effect on the main discharge, is provide on a surface within a prescribed surface distance from the discharge space, and an insulating cathode insulating member that is inclined such that the end on the cathode side is highest is arranged on at least one of the upstream and downstream sides of the cathode in close contact with the cathode the prescribed surface distance being a distance sufficient to ensure that when shock waves produced by a main discharge in the discharge space are reflected by the reflector toward the discharge space, those shock waves will not return to the discharge space before the following main discharge occurs.

3. The discharge excitation type pulse laser apparatus according claim 2, wherein the prescribed surface distance is determined based on an acoustic velocity (V) in the laser gas and an oscillation frequency (τ) of the laser light.

4. The discharge excitation type pulse laser apparatus according claim 3, wherein the prescribed surface distance is larger than in terms of the relation between an acoustic velocity (V) in the laser gas and an oscillation frequency (τ) of the laser light.

5. The discharge excitation type pulse laser apparatus according to claim 4, wherein the prescribed surface distance is larger than the larger value between the value of V/(2τ) and the tripled value of the distance between the main electrodes.

6. The discharge excitation type pulse laser apparatus according claim 3, wherein insulation ribs are provide in an area further than the prescribed surface distance from the cathode side end of the cathode insulating member.

7. The discharge excitation type pulse laser apparatus according claim 3, wherein the upper limit of the size of the reflector is 1 mm.

8. The discharge excitation type pulse laser apparatus according claim 3, wherein no reflector larger than a prescribed size is provided on a surface within a prescribed surface distance from the discharge space, and an anode insulating member that is inclined such that an end on the anode side is highest is arranged on at least one of the upstream and downstream sides of the anode in close contact with the anode.

9. The discharge excitation type pulse laser apparatus according claim 3, wherein a preionization electrode having an internal electric conductor and a dielectric is embedded in an insulating member such that the surface of the dielectric is substantially flush with the surface of the insulating member.

10. The discharge excitation type pulse laser apparatus according claim 9, wherein the dielectric of the preionization electrode has a prismatic shape.

11. The discharge excitation type pulse laser apparatus according claim 9, wherein the dielectric of the preionization electrode has a cylindrical shape that is partially flattened by removing a part of the cylindrical dielectric.

12. The discharge excitation type pulse laser apparatus according to claim 7, wherein no reflector larger than a prescribed size is provided on a surface within a prescribed surface distance from the discharge space, and an anode insulating member that is inclined such an end on the anode side is highest is arranged on at least one of the upstream and downstream sides of the anode in contact with the anode.

13. The discharge excitation type pulse laser apparatus according claim 8, wherein a preionization electrode having an internal electric conductor and a dielectric is embedded in a insulating member such that the surface of the dielectric is substantially flush with the surface of the insulating member.

* * * * *